United States Patent
Lindahl et al.

(10) Patent No.: US 9,602,929 B2
(45) Date of Patent: Mar. 21, 2017

(54) TECHNIQUES FOR PRESENTING SOUND EFFECTS ON A PORTABLE MEDIA PLAYER

(71) Applicant: Apple Inc., Cupertino, CA (US)

(72) Inventors: Aram Lindahl, Menlo Park, CA (US); Joseph Mark Williams, Morgan Hill, CA (US); Muthya K. Girish, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 597 days.

(21) Appl. No.: 13/660,839

(22) Filed: Oct. 25, 2012

(65) Prior Publication Data

US 2013/0044883 A1 Feb. 21, 2013

Related U.S. Application Data

(63) Continuation of application No. 11/144,541, filed on Jun. 3, 2005, now Pat. No. 8,300,841.

(51) Int. Cl.
| | |
|---|---|
| *H04R 5/04* | (2006.01) |
| *G06F 3/16* | (2006.01) |
| *G11B 20/10* | (2006.01) |

(52) U.S. Cl.
CPC .............. *H04R 5/04* (2013.01); *G06F 3/165* (2013.01); *G11B 2020/10555* (2013.01)

(58) Field of Classification Search
CPC ......... H04R 5/04; G06F 13/16; G06F 13/162; G06F 13/165; G11B 20/10037; G11B 2020/10546; G11B 2020/10555; G11B 2020/1062
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,908,523 A | 3/1990 | Snowden et al. |

(Continued)

FOREIGN PATENT DOCUMENTS

| | | |
|---|---|---|
| DE | 43 34 773 A1 | 4/1994 |
| DE | 44 45 023 A1 | 6/1996 |

(Continued)

OTHER PUBLICATIONS

Office Action dated Mar. 25, 2010 in U.S. Appl. No. 11/297,032.

(Continued)

*Primary Examiner* — Davetta W Goins
*Assistant Examiner* — Daniel Sellers
(74) *Attorney, Agent, or Firm* — Blakely, Sokoloff, Taylor & Zafman LLP

(57) ABSTRACT

Improved techniques for presenting sound effects at a portable media device are disclosed. The sound effects can be output as audio sounds to an internal speaker, an external speaker, or both. In addition, the audio sounds for the sound effects can be output together with other audio sounds pertaining to media assets (e.g., audio tracks being played). In one embodiment, the sound effects can serve to provide auditory feedback to a user of the portable media device. A user interface can facilitate a user's selection of sound effect usages, types or characteristics.

24 Claims, 10 Drawing Sheets

(56) References Cited

U.S. PATENT DOCUMENTS

| | | | |
|---|---|---|---|
| 4,928,307 A | 5/1990 | Lynn | |
| 4,951,171 A | 8/1990 | Tran et al. | |
| 5,185,906 A | 2/1993 | Brooks | |
| 5,293,494 A | 3/1994 | Saito et al. | |
| 5,379,057 A | 1/1995 | Clough | |
| 5,406,305 A | 4/1995 | Shimomura et al. | |
| 5,559,945 A | 9/1996 | Beaudet et al. | |
| 5,566,337 A | 10/1996 | Szymanski et al. | |
| 5,583,993 A | 12/1996 | Foster et al. | |
| 5,596,260 A | 1/1997 | Moravec et al. | |
| 5,608,698 A | 3/1997 | Yamanoi et al. | |
| 5,616,876 A | 4/1997 | Cluts | |
| 5,617,386 A | 4/1997 | Choi | |
| 5,670,985 A | 9/1997 | Cappels, Sr. et al. | |
| 5,675,362 A | 10/1997 | Clough | |
| 5,684,513 A | 11/1997 | Decker | |
| 5,710,922 A | 1/1998 | Alley et al. | |
| 5,712,949 A | 1/1998 | Kato et al. | |
| 5,717,422 A | 2/1998 | Fergason | |
| 5,721,949 A | 2/1998 | Smith et al. | |
| 5,726,672 A | 3/1998 | Hernandez et al. | |
| 5,739,451 A | 4/1998 | Winksy et al. | |
| 5,740,143 A | 4/1998 | Suetomi | |
| 5,760,588 A | 6/1998 | Bailey | |
| 5,778,374 A | 7/1998 | Dang et al. | |
| 5,803,786 A | 9/1998 | McCormick | |
| 5,815,225 A | 9/1998 | Nelson | |
| 5,822,288 A | 10/1998 | Shinada | |
| 5,835,721 A | 11/1998 | Donahue et al. | |
| 5,835,732 A | 11/1998 | Kikinis et al. | |
| 5,838,969 A | 11/1998 | Jacklin et al. | |
| 5,864,868 A | 1/1999 | Contois | |
| 5,867,163 A | 2/1999 | Kurtenbach | |
| 5,870,710 A | 2/1999 | Ozawa et al. | |
| 5,890,017 A * | 3/1999 | Tulkoff | G06F 3/16 709/203 |
| 5,918,303 A | 6/1999 | Yamaura et al. | |
| 5,920,728 A | 7/1999 | Hallowell et al. | |
| 5,923,757 A | 7/1999 | Hocker et al. | |
| 5,952,992 A | 9/1999 | Helms | |
| 5,982,902 A | 11/1999 | Terano | |
| 5,998,972 A | 12/1999 | Gong | |
| 6,006,274 A | 12/1999 | Hawkins et al. | |
| 6,009,237 A | 12/1999 | Hirabayashi et al. | |
| 6,011,585 A | 1/2000 | Anderson | |
| 6,018,705 A | 1/2000 | Gaudet et al. | |
| 6,041,023 A | 3/2000 | Lakhansingh | |
| 6,052,654 A | 4/2000 | Gaudet et al. | |
| 6,108,426 A | 8/2000 | Stortz | |
| 6,122,340 A | 9/2000 | Darley et al. | |
| 6,158,019 A | 12/2000 | Squibb | |
| 6,161,944 A | 12/2000 | Leman | |
| 6,172,948 B1 | 1/2001 | Keller et al. | |
| 6,179,432 B1 | 1/2001 | Zhang et al. | |
| 6,185,163 B1 | 2/2001 | Bickford et al. | |
| 6,191,939 B1 | 2/2001 | Burnett | |
| 6,208,044 B1 | 3/2001 | Viswanadham et al. | |
| 6,216,131 B1 | 4/2001 | Liu et al. | |
| 6,217,183 B1 | 4/2001 | Shipman | |
| 6,222,347 B1 | 4/2001 | Gong | |
| 6,248,946 B1 | 6/2001 | Dwek | |
| 6,295,541 B1 | 9/2001 | Bodnar et al. | |
| 6,297,795 B1 | 10/2001 | Kato et al. | |
| 6,298,314 B1 | 10/2001 | Blackadar et al. | |
| 6,332,175 B1 | 12/2001 | Birrell et al. | |
| 6,336,365 B1 | 1/2002 | Blackadar et al. | |
| 6,336,727 B1 | 1/2002 | Kim | |
| 6,341,316 B1 | 1/2002 | Kloba et al. | |
| 6,357,147 B1 | 3/2002 | Darley et al. | |
| 6,377,530 B1 | 4/2002 | Burrows | |
| 6,452,610 B1 | 9/2002 | Reinhardt et al. | |
| 6,467,924 B2 | 10/2002 | Shipman | |
| 6,493,652 B1 | 12/2002 | Ohlenbusch et al. | |
| 6,536,139 B2 | 3/2003 | Darley et al. | |
| 6,549,497 B2 | 4/2003 | Miyamoto et al. | |
| 6,560,903 B1 | 5/2003 | Darley | |
| 6,587,403 B1 | 7/2003 | Keller et al. | |
| 6,587,404 B1 | 7/2003 | Keller et al. | |
| 6,605,038 B1 | 8/2003 | Teller et al. | |
| 6,606,281 B2 | 8/2003 | Cowgill et al. | |
| 6,611,607 B1 | 8/2003 | Davis et al. | |
| 6,611,789 B1 | 8/2003 | Darley | |
| 6,617,963 B1 | 9/2003 | Watters et al. | |
| 6,621,768 B1 | 9/2003 | Keller et al. | |
| 6,623,427 B2 | 9/2003 | Mandigo | |
| 6,631,101 B1 | 10/2003 | Chan et al. | |
| 6,658,577 B2 | 12/2003 | Huppi et al. | |
| 6,693,612 B1 | 2/2004 | Matsumoto et al. | |
| 6,728,584 B1 * | 4/2004 | Duan et al. | 700/94 |
| 6,731,312 B2 | 5/2004 | Robbin | |
| 6,760,536 B1 | 7/2004 | Amir et al. | |
| 6,762,741 B2 | 7/2004 | Weindorf | |
| 6,781,611 B1 | 8/2004 | Richard | |
| 6,794,566 B2 | 9/2004 | Pachet | |
| 6,799,226 B1 | 9/2004 | Robbin et al. | |
| 6,801,964 B1 | 10/2004 | Mahdavi | |
| 6,832,373 B2 | 12/2004 | O'Neill | |
| 6,844,511 B1 | 1/2005 | Hsu et al. | |
| 6,870,529 B1 | 3/2005 | Davis | |
| 6,871,063 B1 | 3/2005 | Schiffer | |
| 6,876,947 B1 | 4/2005 | Darley et al. | |
| 6,882,955 B1 | 4/2005 | Ohlenbusch et al. | |
| 6,886,749 B2 | 5/2005 | Chiba et al. | |
| 6,898,550 B1 | 5/2005 | Blackadar et al. | |
| 6,911,971 B2 | 6/2005 | Suzuki et al. | |
| 6,918,677 B2 | 7/2005 | Shipman | |
| 6,931,377 B1 | 8/2005 | Seya | |
| 6,934,812 B1 | 8/2005 | Robbin et al. | |
| 6,950,087 B2 | 9/2005 | Knox et al. | |
| 6,950,603 B1 * | 9/2005 | Isozaki et al. | 386/208 |
| 7,010,365 B2 | 3/2006 | Maymudes | |
| 7,028,096 B1 | 4/2006 | Lee | |
| 7,046,230 B2 | 5/2006 | Zadesky et al. | |
| 7,062,225 B2 | 6/2006 | White | |
| 7,076,561 B1 | 7/2006 | Rosenberg et al. | |
| 7,084,856 B2 | 8/2006 | Huppi | |
| 7,084,921 B1 | 8/2006 | Ogawa | |
| 7,092,946 B2 | 8/2006 | Bodnar | |
| 7,124,125 B2 | 10/2006 | Cook et al. | |
| 7,131,059 B2 | 10/2006 | Obrador | |
| 7,143,241 B2 | 11/2006 | Hull | |
| 7,146,437 B2 | 12/2006 | Robbin et al. | |
| 7,171,331 B2 | 1/2007 | Vock et al. | |
| 7,191,244 B2 | 3/2007 | Jennings et al. | |
| 7,213,228 B2 | 5/2007 | Putterman et al. | |
| 7,216,008 B2 * | 5/2007 | Sakata | 700/94 |
| 7,234,026 B2 | 6/2007 | Robbin et al. | |
| 7,277,928 B2 | 10/2007 | Lennon | |
| 7,301,857 B2 | 11/2007 | Shah et al. | |
| 7,356,679 B1 | 4/2008 | Le et al. | |
| 7,508,535 B2 | 3/2009 | Hart et al. | |
| 2001/0013983 A1 | 8/2001 | Izawa et al. | |
| 2001/0029178 A1 | 10/2001 | Criss et al. | |
| 2001/0037367 A1 | 11/2001 | Iyer | |
| 2001/0041021 A1 | 11/2001 | Boyle et al. | |
| 2001/0042107 A1 | 11/2001 | Palm | |
| 2002/0002413 A1 | 1/2002 | Tokue | |
| 2002/0013784 A1 | 1/2002 | Swanson | |
| 2002/0028683 A1 | 3/2002 | Banatre et al. | |
| 2002/0045961 A1 | 4/2002 | Gibbs et al. | |
| 2002/0046315 A1 | 4/2002 | Miller et al. | |
| 2002/0055934 A1 | 5/2002 | Lipscomb et al. | |
| 2002/0059440 A1 | 5/2002 | Hudson et al. | |
| 2002/0059499 A1 | 5/2002 | Hudson | |
| 2002/0090912 A1 | 7/2002 | Cannon et al. | |
| 2002/0116082 A1 | 8/2002 | Gudorf | |
| 2002/0116517 A1 | 8/2002 | Hudson et al. | |
| 2002/0122031 A1 | 9/2002 | Maglio et al. | |
| 2002/0123359 A1 | 9/2002 | Wei et al. | |
| 2002/0152045 A1 | 10/2002 | Dowling et al. | |
| 2002/0156833 A1 | 10/2002 | Maurya et al. | |
| 2002/0161865 A1 | 10/2002 | Nguyen | |
| 2002/0173273 A1 | 11/2002 | Spurgat et al. | |
| 2002/0189426 A1 | 12/2002 | Hirade et al. | |

(56) References Cited

U.S. PATENT DOCUMENTS

| | | |
|---|---|---|
| 2002/0189429 A1 | 12/2002 | Qian et al. |
| 2002/0199043 A1 | 12/2002 | Yin |
| 2003/0002688 A1 | 1/2003 | Kanevsky et al. |
| 2003/0007001 A1 | 1/2003 | Zimmerman |
| 2003/0018799 A1 | 1/2003 | Eyal |
| 2003/0037254 A1 | 2/2003 | Fischer et al. |
| 2003/0046434 A1 | 3/2003 | Flanagin et al. |
| 2003/0050092 A1 | 3/2003 | Yun |
| 2003/0074457 A1 | 4/2003 | Kluth |
| 2003/0076301 A1 | 4/2003 | Tsuk et al. |
| 2003/0076306 A1 | 4/2003 | Zadesky |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0104835 A1 | 6/2003 | Douhet |
| 2003/0127307 A1 | 7/2003 | Liu et al. |
| 2003/0128192 A1 | 7/2003 | van Os |
| 2003/0133694 A1 | 7/2003 | Yeo |
| 2003/0153213 A1 | 8/2003 | Siddiqui et al. |
| 2003/0156503 A1 | 8/2003 | Schilling et al. |
| 2003/0167318 A1 | 9/2003 | Robbin et al. |
| 2003/0176935 A1 | 9/2003 | Lian et al. |
| 2003/0182100 A1 | 9/2003 | Plastina et al. |
| 2003/0221541 A1 | 12/2003 | Platt |
| 2003/0229490 A1 | 12/2003 | Etter |
| 2003/0236695 A1 | 12/2003 | Litwin, Jr. |
| 2004/0001395 A1 | 1/2004 | Keller et al. |
| 2004/0001396 A1 | 1/2004 | Keller et al. |
| 2004/0012556 A1 | 1/2004 | Yong et al. |
| 2004/0055446 A1 | 3/2004 | Robbin et al. |
| 2004/0066363 A1 | 4/2004 | Yamano et al. |
| 2004/0069122 A1 | 4/2004 | Wilson |
| 2004/0076086 A1 | 4/2004 | Keller |
| 2004/0086120 A1 | 5/2004 | Akins, III et al. |
| 2004/0094018 A1 | 5/2004 | Ueshima et al. |
| 2004/0103411 A1 | 5/2004 | Thayer |
| 2004/0125522 A1 | 7/2004 | Chiu et al. |
| 2004/0165302 A1 | 8/2004 | Lu |
| 2004/0177063 A1 | 9/2004 | Weber et al. |
| 2004/0198436 A1 | 10/2004 | Alden |
| 2004/0210628 A1 | 10/2004 | Inkinen et al. |
| 2004/0216108 A1 | 10/2004 | Robbin |
| 2004/0224638 A1 | 11/2004 | Fadell et al. |
| 2004/0242224 A1 | 12/2004 | Janik et al. |
| 2004/0246275 A1 | 12/2004 | Yoshihara et al. |
| 2004/0255135 A1 | 12/2004 | Kitaya et al. |
| 2004/0267825 A1 | 12/2004 | Novak et al. |
| 2005/0015254 A1 | 1/2005 | Beaman |
| 2005/0053365 A1 | 3/2005 | Adams et al. |
| 2005/0060240 A1 | 3/2005 | Popofsky |
| 2005/0060542 A1 | 3/2005 | Risan et al. |
| 2005/0108754 A1 | 5/2005 | Carhart et al. |
| 2005/0111820 A1 | 5/2005 | Matsumi et al. |
| 2005/0122315 A1 | 6/2005 | Chalk et al. |
| 2005/0123886 A1 | 6/2005 | Hua et al. |
| 2005/0146534 A1 | 7/2005 | Fong et al. |
| 2005/0149213 A1 | 7/2005 | Guzak et al. |
| 2005/0152294 A1 | 7/2005 | Yu et al. |
| 2005/0156047 A1 | 7/2005 | Chiba et al. |
| 2005/0160270 A1 | 7/2005 | Goldberg et al. |
| 2005/0166153 A1 | 7/2005 | Eytchison et al. |
| 2005/5152294 | 7/2005 | Yu et al. |
| 2005/0216855 A1 | 9/2005 | Kopra et al. |
| 2005/0218303 A1 | 10/2005 | Poplin |
| 2005/0234983 A1 | 10/2005 | Plastina et al. |
| 2005/0245839 A1 | 11/2005 | Stivoric et al. |
| 2005/0246324 A1 | 11/2005 | Paalasmaa et al. |
| 2005/0248555 A1 | 11/2005 | Feng et al. |
| 2005/0257169 A1 | 11/2005 | Tu |
| 2005/0259064 A1 | 11/2005 | Sugino et al. |
| 2005/0259524 A1 | 11/2005 | Yeh |
| 2006/0013414 A1 | 1/2006 | Shih |
| 2006/0025068 A1 | 2/2006 | Regan et al. |
| 2006/0026424 A1 | 2/2006 | Eto |
| 2006/0061563 A1 | 3/2006 | Fleck |
| 2006/0068760 A1 | 3/2006 | Hameed et al. |
| 2006/0071899 A1 | 4/2006 | Chang et al. |
| 2006/0088228 A1 | 4/2006 | Marriott et al. |
| 2006/0092122 A1 | 5/2006 | Yoshihara et al. |
| 2006/0094409 A1 | 5/2006 | Inselberg |
| 2006/0095502 A1 | 5/2006 | Lewis et al. |
| 2006/0098320 A1 | 5/2006 | Koga et al. |
| 2006/0135883 A1 | 6/2006 | Jonsson et al. |
| 2006/0145053 A1 | 7/2006 | Stevenson et al. |
| 2006/0152382 A1 | 7/2006 | Hiltunen |
| 2006/0155914 A1 | 7/2006 | Jobs et al. |
| 2006/0170535 A1 | 8/2006 | Watters et al. |
| 2006/0173974 A1 | 8/2006 | Tang |
| 2006/0190577 A1 | 8/2006 | Yamada |
| 2006/0190980 A1 | 8/2006 | Kikkoji et al. |
| 2006/0221057 A1 | 10/2006 | Fux et al. |
| 2006/0221788 A1 | 10/2006 | Lindahl et al. |
| 2006/0259758 A1 | 11/2006 | Deng et al. |
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0061759 A1 | 3/2007 | Klein, Jr. |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0129062 A1 | 6/2007 | Pantalone et al. |
| 2007/0135225 A1 | 6/2007 | Nieminen et al. |
| 2007/0248311 A1 | 10/2007 | Wice et al. |
| 2007/0255163 A1 | 11/2007 | Prineppi |
| 2008/0055228 A1 | 3/2008 | Glen |
| 2008/0134287 A1 | 6/2008 | Gudorf et al. |
| 2010/0077338 A1 | 3/2010 | Matthews et al. |

FOREIGN PATENT DOCUMENTS

| | | |
|---|---|---|
| EP | 0 127 139 | 5/1984 |
| EP | 0578604 | 1/1994 |
| EP | 0 757 437 | 2/1997 |
| EP | 0 813 138 | 12/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1 213 643 | 6/2002 |
| EP | 1 289 197 | 3/2003 |
| EP | 1 503 363 | 2/2005 |
| EP | 1536612 | 6/2005 |
| EP | 1 566 743 | 8/2005 |
| EP | 1566948 | 8/2005 |
| EP | 1 372 133 | 12/2005 |
| EP | 1 686 496 | 8/2006 |
| GB | 2 370 208 | 6/2002 |
| GB | 2384399 | 7/2003 |
| GB | 2399639 | 5/2005 |
| JP | 59-023610 | 2/1984 |
| JP | 03-228490 | 10/1991 |
| JP | 04-243386 | 8/1992 |
| JP | 6-96520 | 4/1994 |
| JP | 8-235774 | 9/1996 |
| JP | 9-50676 | 2/1997 |
| JP | 9-259532 | 10/1997 |
| JP | 2000-90651 | 3/2000 |
| JP | 2000-224099 | 8/2000 |
| JP | 2000-285643 | 10/2000 |
| JP | 2000-299834 | 10/2000 |
| JP | 2000-311352 | 11/2000 |
| JP | 2000-339864 | 12/2000 |
| JP | 2001-236286 | 8/2001 |
| JP | 2001/312338 | 11/2001 |
| JP | 2001-312338 | 11/2001 |
| JP | 2002-076977 | 3/2002 |
| JP | 2002-175467 | 6/2002 |
| JP | 2003-188792 | 7/2003 |
| JP | 2003-259333 | 9/2003 |
| JP | 2003-319365 | 11/2003 |

(56) References Cited

FOREIGN PATENT DOCUMENTS

| | | |
|---|---|---|
| JP | 2004-021720 | 1/2004 |
| JP | 2004-219731 | 8/2004 |
| JP | 2004-220420 | 8/2004 |
| KR | 20010076508 | 8/2001 |
| WO | WO 95/16950 | 6/1995 |
| WO | 98/17032 | 4/1998 |
| WO | WO 99/28813 | 6/1999 |
| WO | WO 00/22820 | 4/2000 |
| WO | WO 01/33569 | 5/2001 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/036457 | 5/2003 |
| WO | WO 03/067202 | 8/2003 |
| WO | 2004/061850 A1 | 7/2004 |
| WO | WO 2004/055637 | 7/2004 |
| WO | WO2004/084413 A2 | 9/2004 |
| WO | WO 2004/104815 | 12/2004 |
| WO | WO 2005/031737 | 4/2005 |
| WO | 2005/048644 | 5/2005 |
| WO | WO 2005/048644 | 5/2005 |
| WO | WO 2005/008505 | 7/2005 |
| WO | 2005/109781 | 11/2005 |
| WO | WO 2006/040737 | 4/2006 |
| WO | 2006/071364 | 6/2006 |

OTHER PUBLICATIONS

Office Action dated Mar. 10, 2010 in U.S. Appl. No. 11/583,327.
Office Action dated Mar. 11, 2010 in U.S. Appl. No. 11/830,746.
Office Action dated Mar. 4, 2010 in U.S. Appl. No. 11/324,863.
Office Action dated Feb. 3, 2010 in U.S. Appl. No. 11/439,613.
Office Action dated Dec. 14, 2009 in U.S. Appl. No. 11/535,646.
Office Action dated Sep. 25, 2009 in Chinese Application No. 200610130904.1.
Notice of Allowance dated Feb. 4, 2010 in U.S. Appl. No. 11/535,646.
Office Action dated Apr. 12, 2010 in U.S. Appl. No. 12/397,051.
Office Action dated Apr. 13, 2010 in U.S. Appl. No. 12/406,793.
Office Action dated Apr. 15, 2010 in U.S. Appl. No. 11/373,468.
Office Action dated Sep. 3, 2009 in U.S. Appl. No. 11/324,863.
Office Action dated Jan. 26, 2009 in U.S. Appl. No. 11/373,468.
Office Action dated Jun. 24, 2009 in U.S. Appl. No. 11/373,468.
Kadir et al., "Adaptive Fast Playback-Based Video Skimming Using a Compressed-Domain Visual Complexity Measure", 2004 IEEE International Conference on Multimedia and Expo, pp. 2055-2058.
Office Action dated Oct. 16, 2008 in U.S. Appl. No. 11/327,544.
Office Action in European Patent Application No. 05 855 368.6 dated Nov. 20, 2008.
Office Action dated Dec. 15, 2008 in U.S. Appl. No. 11/212,313.
Notice of Allowance dated Dec. 18, 2008 in U.S. Appl. No. 11/212,555.
International Search Report dated Oct. 10, 2008 in PCT Application No. PCT/US2007/077160.
Written Opinion dated Oct. 10, 2008 in PCT Application No. PCT/US2007/077160.
Office Action dated Sep. 1, 2008 in EP Application No. 06 256 215.2.
Written Opinion dated Jan. 6, 2009 in Singapore Application No. 200701865-8.
Office Action dated May 27, 2009 in U.S. Appl. No. 11/439,613.
Office Action dated Jun. 2, 2009 in U.S. Appl. No. 11/530,773.
Office Action dated May 11, 2009 in U.S. Appl. No. 11/680,580.
Notice of Allowance dated Apr. 21, 2009 in U.S. Appl. No. 11/327,544.
Office Action dated Mar. 30, 2009 in U.S. Appl. No. 11/515,270.
Office Action dated Apr. 9, 2009 in U.S. Appl. No. 11/583,199.
Notice of Allowance dated Jun. 15, 2009 in U.S. Appl. No. 11/212,313.
Office Action dated Jun. 22, 2009 in U.S. Appl. No. 11/515,270.
Office Action dated Jun. 24, 2009 in U.S. Appl. No. 11/519,352.
Office Action dated Sep. 10, 2009 in U.S. Appl. No. 11/746,548.
Office Action dated Sep. 2, 2009 in U.S. Appl. No. 11/515,270.
Office Action dated Oct. 16, 2009 in U.S. Appl. No. 11/583,199.
Office Action dated Oct. 23, 2009 in Chinese Application No. 200580048143.9.
Office Action dated Nov. 16, 2009 in U.S. Appl. No. 11/439,613.
Office Action dated May 29, 2009 in EP Application No. 06 847 856.9.
Office Action dated Dec. 11, 2009 in U.S. Appl. No. 11/519,352.
Office Action dated Dec. 16, 2009 in U.S. Appl. No. 11/746,548.
Examination Report dated Sep. 1, 2009 in Singapore Application No. 200701865-8.
U.S. Appl. No. 10/125,893, filed Apr. 18, 2002 and titled "Power Adapters for Powering and/or Charging Peripheral Devices."
International Search Report dated Dec. 5, 2007 in PCT Application No. PCT/US2007/004810.
Written Opinion dated Dec. 5, 2007 in PCT Application No. PCT/US2007/004810.
Partial Search Report dated Sep. 6, 2007 in PCT Application No. PCT/US2007/004810.
Apple iTunes Smart Playlists, downloaded Apr. 5, 2005 from http://web.archive.org/web/20031002113 16/www.apple.com/itunes/smartplaylists . . . pp. 1-2.
International Search Report dated Dec. 5, 2007 in Patent Application No. PCT/US2007/004810.
International Search Report in Patent Application No. PCT/US2006/048738 dated Jan. 29, 2008.
International Search Report in Patent Application No. PCT/US2007/077020 dated Jan. 28, 2008.
International Search Report in Patent Application No. PCT/US2007/076889 dated Jan. 28, 2008.
iTunes, Wikipedia: The Free Encyclopedia; downloaded on Oct. 5, 2005, pp. 1-6.
Nutzel et al., "Sharing Systems for Future HiFi Systems", The Computer Society, Jun. 2004.
Partial Search Report dated Sep. 6, 2007 in Patent Application No. PCT/US2007/004810.
Written Opinion dated Dec. 5, 2007 in Patent Application No. PCT/US2007/004810.
Written Opinion in Patent Application No. PCT/US2006/048738 dated Jan. 29, 2008.
Written Opinion in Patent Application No. PCT/US2007/076889 dated Jan. 28, 2008.
Written Opinion in Patent Application No. PCT/US2007/077020 dated Jan. 28, 2008.
Office Action dated Feb. 1, 2008 in U.S. Appl. No. 11/327,544.
Hart-Daves, Guy, "How To Do Everything With Your iPod and iPod Mini", 2004, McGraw-Hill Professional, p. 33.
Office Action dated Feb. 4, 2008 in U.S. Appl. No. 11/566,072.
"Creative liefert erstes Portable Media Center aus" [Online] Sep. 2, 2004. Retrieved from the internet on Sep. 20, 2007 from http://www.golem.de/0409/33347.html>.
International Search Report dated Feb. 18, 2008 in Patent Application No. PCT/US2007/079766.
International Search Report Dated Sep. 27, 2007 in Application No. 05824296.7.
Office Action dated Apr. 4, 2008 in U.S. Appl. No. 11/212,555.
Office Action dated Feb. 20, 2008 in Japanese Application No. 2007-538196.
Office Action dated Feb. 25, 2008 in U.S. Appl. No. 11/749,599.
Office Action dated Mar. 4, 2008 from U.S. Appl. No. 10/973,657.
Partial International Search Report dated Feb. 1, 2008 in Patent Application No. PCT/US2007/010630.
Written Opinion dated Feb. 18, 2008 in Patent Application No. PCT/US2007/079766.
Invitation to Pay Additional Fees and Partial Search Report for PCT Application No. PCT/US2007/077160 dated Apr. 1, 2008.
"Combination Belt Clip Leaf Spring and Housing Latch", Wandt et al.; Motorola Technical Developments, Motorla Inc. Schaumburg, IL. vol. 18, Mar. 1, 1993.

(56) References Cited

OTHER PUBLICATIONS

"Creative Zen Vision: M 30GB", Dec. 21, 2005; downloaded on Jan. 11, 2008 from http://web.archive.org/web/20051221050140/ http://www.everthingusb.com/creative_zen_vision:m_30gb. html>.
International Search Report dated Jul. 7, 2008 in PCT Application No. PCT/US2007/076793.
International Search Report dated Jun. 10, 2008 in PCT Application No. PCT/US2007/010630.
Notification of Reason for Rejection from PCT Application No. 2003-539048 dated Nov. 27, 2007.
Office Action dated Jun. 17, 2008 in U.S. Appl. No. 11/212,313.
Office Action dated May 30, 2008 in Chinese Patent Application No. 02825938.6.
Office Action in Chinese Patent Application No. 2008-045351 dated Aug. 5, 2008.
Office Action in U.S. Appl. No. 11/212,555 dated Aug. 14, 2008.
Search Report dated May 15, 2008 in PCT Application No. PCT/US2007/019578.
Written Opinion dated Jul. 7, 2008 in PCT Application No. PCT/US2007/076793.
Written Opinion dated Jun. 10, 2008 in PCT Application No. PCT/US2007/010630.
Written Opinion dated May 15, 2008 in PCT Application No. PCT/US2007/019578.
Yee et al., "Faceted Metadata for Image Search and Browsing." Association for Computing Machinery, Conference Proceedings, Apr. 5, 2003.
"Apple Announces iTunes 2," Press Release, Apple Computer, Inc., Oct. 23, 2001.
"Apple Introduces iTunes—World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"12.1" 925 Candela Mobile PC", downloaded from LCDHardware. com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Digital Still Cameras—Downloading Images to a Computer," Mimi Chakarova et al., Multi-Media Reporting and Convergence, 2 pgs.
"Eluminx Illuminated Keyboard", downloaded Dec. 19, 2002, http://www.elumix.com/.
"How to Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly-optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asj_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en &ver=4001&template=pc3_1_&z.
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scid=11 &pid=581.
Adam C. Engst, "SoundJam Keeps on Jammin'." Jun. 19, 2000, http://db.tidbits.com/getbits.acgi?tbart=05988.
Alex Veiga, "AT&T Wireless Launching Music Service," Yahoo! Finance, Oct. 5, 2004, pp. 1-2.
Andrew Birrell, "Personal Jukebox (PJB)," Oct. 13, 2000, http://birrell.org/andrew/talks/pjb-overview.ppt.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Compaq, "Personal Jukebox," Jan. 24, 2001, http://research.compaq.com/SRC/pjb/.
Creative: "Creative NOMAD MuVo TX," www.creative.com, Nov. 1, 2004, http://web.archive.org/web/20041024175962/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].
De Herrara, Chris, "Microsoft ActiveSync 3.1," Version 1.02, Oct. 13, 2000.
iAP Sports Lingo 0x09 Protocol V1.00, May 1, 2006.
IEEE 1394—Wikipedia, 1995, http://www.wikipedia.org/wiki/Firewire.
Written Opinion of the International Searching Authority dated Nov. 24, 2006 in PCT Application No. PCT/US2005/046797.
International Search Report dated Feb. 4, 2003 in corresponding application No. PCT/US2002/033330.
International Search Report dated Jul. 10, 2007 in corresponding application No. PCT/US2006/048738.
International Search Report dated Apr. 5, 2006 from corresponding International Application No. PCT/US2005/038819.
International Search Report dated Jul. 2, 2007 in related case PCT/US2006/048669.
International Search Report dated Jun. 19, 2007 in related Application PCT/US2006/048753.
International Search Report dated May 21, 2007 from corresponding PCT Application No. PCT/US2006/048670.
International Search Report in corresponding European Application No. 06256215.2 dated Feb. 20, 2007.

(56) References Cited

OTHER PUBLICATIONS

Invitation to Pay Additional Fees and Partial Search Report for corresponding PCT Application No. PCT/US2005/046797 dated Jul. 3, 2006.
iTunes 2, Playlist Related Help Screens, iTunes v2,0, Apple Computer, Inc., Oct. 23, 2001.
iTunes, Playlist Related Help Screens, iTunes v1.0, Apple Computer, Inc., Jan. 2001.
Jabra Bluetooth Headset User Manual; GN Netcom A/s, 2005.
Jabra Bluetooth Introduction; GN Netcom A/S, Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2. Jul. 1981.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.
International Search Report dated Nov. 24, 2006 in PCT Application No. PCT/US2005/046797.
Personal Jukebox (PJB), "Systems Research Center and PAAD," Compaq Computer Corp., Oct. 13, 2000, http://research.compaq.com/SRC/pjb/.
Peter Lewis, "Two New Ways to Buy Your Bits," CNN Money, Dec. 31, 2003. pp. 1-4.
Sastry, Ravindra Wadali. "A Need for Speed: A New Speedometer for Runners", submitted to the Department of Electrical Engineering and Computer Science at the Massachusetts Institute of Technology, May 28, 1999.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate . . . Downloaded Aug. 16, 2006.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
U.S. Appl. No. 11/621,541, "Personalized Podcasting Podmapping" filed Jan. 9, 2007.
Waterproof Music Player with FM Radio and Pedometer User Manual, Oregon Scientific, 2005.

* cited by examiner

TECHNIQUES FOR PRESENTING SOUND EFFECTS ON A PORTABLE MEDIA PLAYER

This application is a continuation of co-pending U.S. application Ser. No. 11/144,541 filed on Jun. 3, 2005.

BACKGROUND OF THE INVENTION

Field of the Invention

The present invention relates to audio sound effects and, more particularly, to providing audio sound effects on a portable media device.

Description of the Related Art

Conventionally, portable media players have user input devices (buttons, dials, etc.) and a display screen for user output. Sometimes the display screen updates as user inputs are provided via the user input devices, thereby providing visual feedback to users regarding their user input. However, the display screen does not always provide visual feedback and the user is not always able to view the display screen to receive the visual feedback. Still further, some portable media players do not include a display screen. Portable media players can also provide auditory feedback as user inputs are provided via the user input devices. For example, to provide auditory feedback for a rotation user input, the iPod® media player, which is available from Apple Computer, Inc. of Cupertino, Calif., outputs a "click" sound using a piezoelectric device provided within the media player.

Unfortunately, however, users often interact with media players while wearing earphones or headphones. In such case, the users will likely not be able to hear any auditory feedback, such as "click" sounds from a piezoelectric device. Moreover, the user might also be listening to audio sounds via the earphones or headphones when the user interaction occurs. Consequently, any users interaction with the media player while wearing earphone or headphones will be without the advantage of auditory feedback. The lack of auditory feedback degrades the user experience and renders the media player less user friendly.

Thus, there is a need for improved techniques to facilitate auditory feedback on portable media players.

SUMMARY OF THE INVENTION

The invention pertains to techniques for presenting sound effects at a portable media device. The sound effects can be output as audio sounds to an internal speaker, an external speaker, or both. In addition, the audio sounds for the sound effects can be output together with other audio sounds pertaining to media assets (e.g., audio tracks being played). In one embodiment, the sound effects can serve to provide auditory feedback to a user of the portable media device. A user interface can facilitate a user's selection of sound effect usages, types or characteristics.

The invention can be implemented in numerous ways, including as a method, system, device, apparatus (including graphical user interface), or computer readable medium. Several embodiments of the invention are discussed below.

As a method for providing auditory feedback to a user of portable media device, one embodiment of the method includes at least the acts of: outputting first audio data pertaining to a digital media asset to an audio output device associated with the portable media device; detecting an event at the portable media device; and outputting second audio data after the event has been detected, the second audio data pertaining to a sound effect associated with the event that has been detected, the second audio data being output to the audio output device.

As a method for outputting a sound effect from an external speaker associated with a portable media device, one embodiment of the method includes at least the acts of: determining whether a sound effect is to be output to the external speaker; identifying sound effect data for the sound effect to be output; retrieving the identified sound effect data; mixing the identified sound effect data with audio data being output, if any, to produce mixed audio data; and outputting the mixed audio data to the external speaker.

As a method for providing auditory feedback to a user of portable media device, one embodiment of the method includes at least the acts of: detecting an event at the portable media device; determining whether device feedback is enabled; producing an auditory feedback at the portable media device in response to the event when it is determined that the device feedback is enabled; determining whether earphone feedback is enabled; and producing an auditory feedback at one or more earphones coupled to the portable media device in response to the event when it is determined that the earphone feedback is enabled.

As a portable media device, one embodiment of the invention includes at least: an audio output device; a first memory device for storing a plurality of sound effects; computer program code for determining when to output at least one of the sound effects; and a processor for determining when to output at least one of the sound effects and for processing the at least one of the sound effects to produce output sound effect data for the audio output device.

As a graphical user interface for a media device adapted to provide auditory feedback, one embodiment of the invention includes at least: a list of auditory feedback options; and a visual indicator that indicates a selected on of the auditory feedback options. The media device thereafter provides auditory feedback in accordance with the selected one of the auditory feedback options.

As a computer readable medium including at least computer program code for outputting a sound effect from an external speaker associated with a portable media device, one embodiment of the invention includes at least: computer program code for determining whether a sound effect is to be output to the external speaker; computer program code for identifying sound effect data for the sound effect to be output; computer program code for retrieving the identified sound effect data; computer program code for mixing the identified sound effect data with audio data being output, if any, to produce mixed audio data; and computer program code for outputting the mixed audio data to the external speaker.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques for presenting sound effects at a portable media device. The sound effects can be output as audio sounds to an internal speaker, an external speaker, or both. In addition, the audio sounds for the sound effects can be output together with other audio sounds pertaining to media assets (e.g., audio tracks being played). In one embodiment, the sound effects can serve to provide auditory feedback to a user of the portable media device. A user interface can facilitate a user's selection of sound effect usages, types or characteristics.

The invention is well suited for audio sounds pertaining to media assets (media items), such as music, audiobooks, meeting recordings, and other speech or voice recordings.

The improved techniques are also resource efficient. Given the resource efficiency of these techniques, the improved techniques are also well suited for use with portable electronic devices having audio playback capabilities, such as portable media devices. Portable media devices, such as media players, are small and highly portable and have limited processing resources. Often, portable media devices are hand-held media devices, such as hand-held audio players, which can be easily held by and within a single hand of a user.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
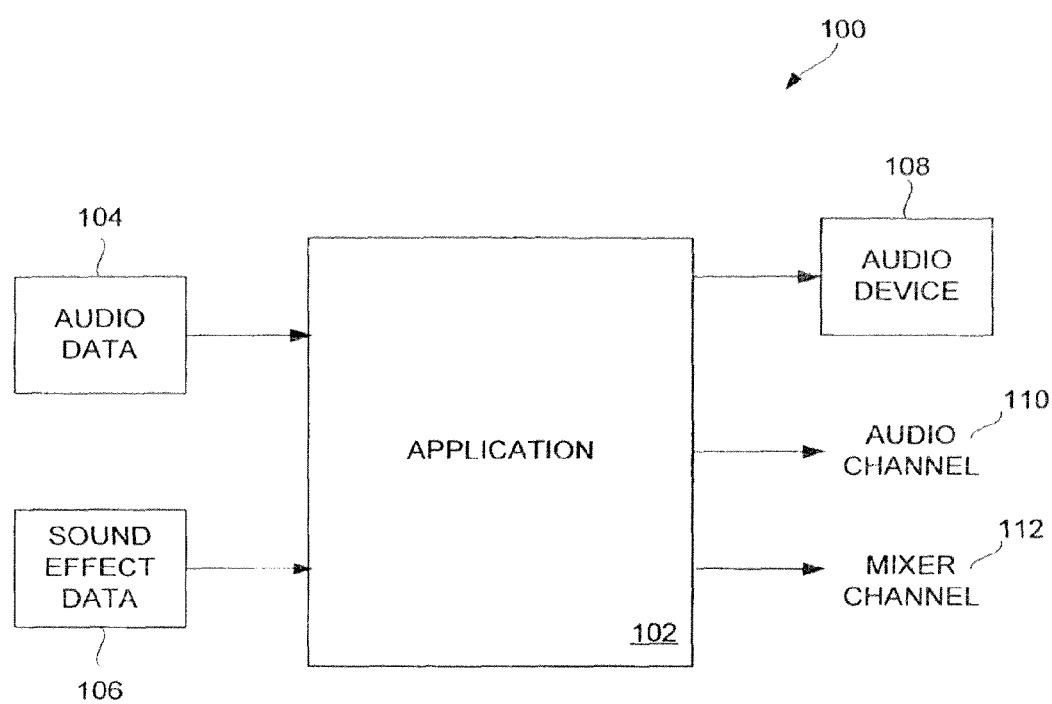
FIG. 1 is a block diagram of an audio system according to one embodiment of the invention.

FIG. 1 is a block diagram of an audio system 100 according to one embodiment of the invention. The audio system 100 depicts a data flow for the audio system 100 under the control of an application 102. Typically, the audio system 100 is provided by a computing device. Often, the computing device is a portable computing device especially designed for audio usage. One example of portable computing devices are portable media players e.g., music players or MP3 players). Another example of portable computing devices are mobile telephones e.g., cell phones) or Personal Digital Assistants (PDA).

The application 102 is, for example, a software application that operates on the computing device. The application 102 has access to audio data 104 and sound effect data 106. The application 102 can utilize the audio data 104 when the application 102 desires to output the audio data 104. The sound effect data 106 can represent audio sounds pertaining to sound effects that can be utilized by the computing device. For example, the sound effects may correspond to sounds (actual or synthetic) for mouse clicks, button presses, and the like. The sound effect data 106 is audio data and can be stored in a wide variety of formats. For example, the sound effect data 106 a can be simply Pulse Coded Modulation (PCM) data or can be encoded data, such as MP3 or MPEG-4 format. PCM data is typically either raw data (e.g., a block of samples) or formatted (e.g., WAV or AIFF file formats).

The application 102 controls when a sound effect is to be output by the audio system 100. The application 102 also understands that it may or may not already be outputting audio data 104 at the time at which a sound effect is to the output. In the embodiment shown in FIG. 1, the application 102 can control an audio device 108. The audio device 108 is a hardware component that is capable of producing a sound, such as a sound effect. For example, the audio device 108 can pertain to an audio output device (e.g., speaker or piezoelectric device) that can be briefly activated to provide a sound effect. The sound affect can serve to inform the user of the computing device of a condition, status or event.

In addition, the application 102 produces an audio channel 110 and a mixer channel 112. The audio channel 110 is a virtual channel over which the application 102 can send audio data 104 such that it can be directed to an audio output device. For example, the audio output device can be a speaker that outputs the corresponding audio sounds. In addition, the application 102 can utilize a mixer channel 112 to output sound effects to the audio output device. The mixer channel 112 and the audio channel 110 can be mixed together downstream (see FIG. 3). Hence, the audio system 100 can not only output audio data 104 over the audio channel 110 but can also output sound effects over the mixer channel 112. As discussed in greater detail below, the audio data on the audio channel 110 can be mix with any sound effect data on the mixer channel 112.

Figure 2:
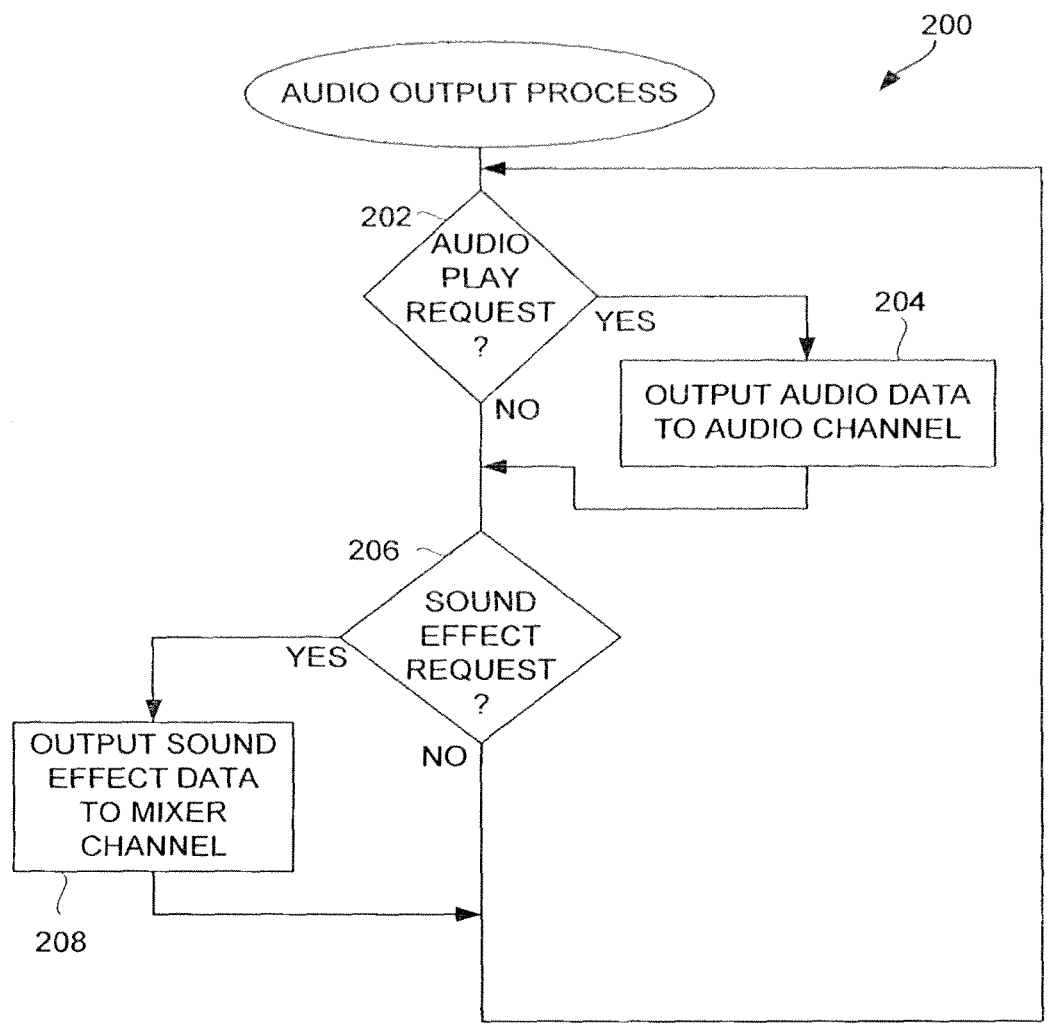
FIG. 2 is a flow diagram of an audio output process according to one embodiment of the invention.

FIG. 2 is a flow diagram of an audio output process 200 according to one embodiment of the invention. The audio output process 200 is performed by an audio system. For example, the audio output process 200 can be performed by the application 102 of the audio system 100 illustrated in FIG. 1.

The audio output process 200 begins with a decision 202 that determines whether an audio play request has been issued. For example, an audio play request can be issued as a result of a system action or a user action with respect to the audio system. When the decision 202 determines that an audio play request has been issued, audio data is output 204 to an audio channel. By outputting the audio data to the audio channel, the audio data is directed to an audio output device, namely, a speaker, wherein audible sound is output.

Following the operation 204, or following the decision 202 when an audio play request has not been issued, a decision 206 determines whether a sound effect request has been issued. When the decision 206 determines that a sound effect request has been issued, then sound effect data is output 208 to a mixer channel. The mixer channel carries other audio data, such as audio data pertaining to sound effects (sound effect data). The mixer channel allows the sound effect data to mix with the audio data on the audio channel. After the sound effect data has been output 208 to the mixer channel, or directly following the decision 206 when a sound effect request has not been issued, the audio output processed 200 turns to repeat the decision 202 and subsequent operations so that subsequent requests can be similarly processed.

It should be understood that often audio data is output for a longer duration than is any sound effect data, which tends to be of a shorter duration. Hence, during the output of the audio data to the audio channel, sound effect data for one or more sound effects can be output to the mixer channel and this combined with the audio data.

Figure 3:
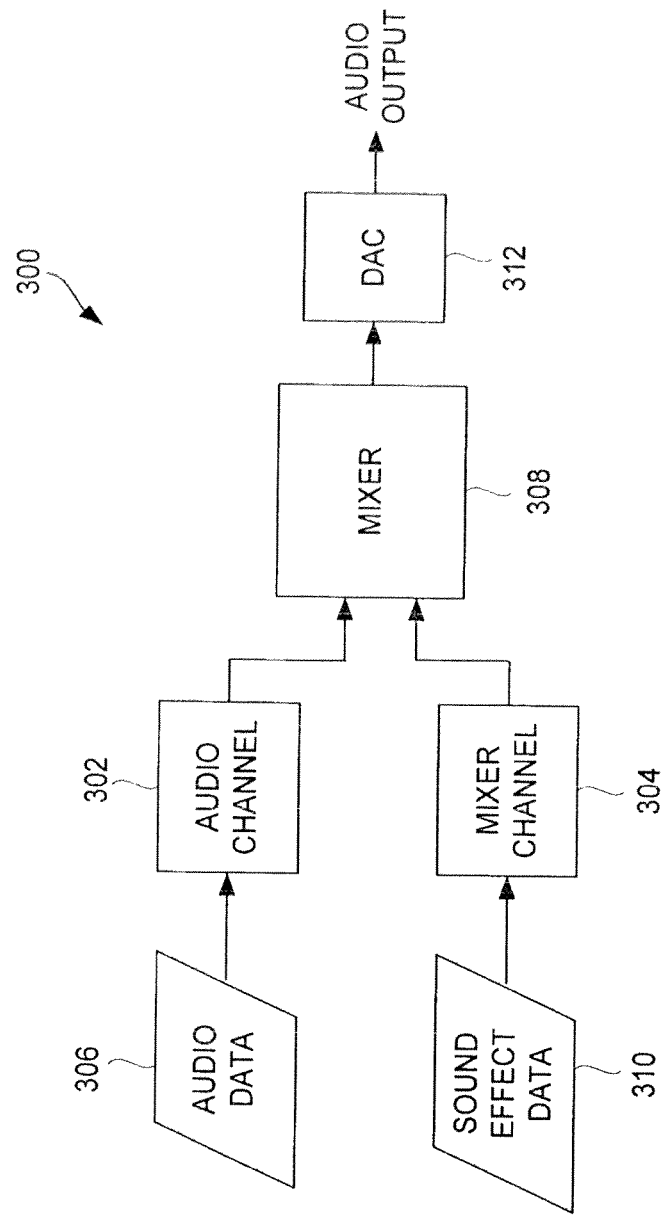
FIG. 3 is a block diagram of an audio processing system according to one embodiment of the invention.

FIG. 3 is a block diagram of an audio processing system 300 according to one embodiment of the invention. The audio processing system 300 includes an audio channel 302 and a mixer channel 304. The audio channel 302 typically includes a decoder and a buffer. The mixer channel 304 typically includes resolution and/or sample rate converters.

The audio channel 302 receives audio data 306 that is to be output by the audio processing system 300. After the audio data 306 passes through the audio channel 302, it is provided to a mixer 380. The mixer channel 304 receives sound effect data 310. After the sound effect data 310 has passed through the mixer channel 304, it is provided to a mixer 308. The mixer 308 serves to combine the audio data from the audio channel 302 with the sound effect data 310 from the mixer channel 304. The combined data is then supplied to a Digital-to-Analog Converter (DAC) 312. The DAC 312 converts the combined data to an analog audio output. The analog audio output can be supplied to an audio output device, such as a speaker.

Figure 4:
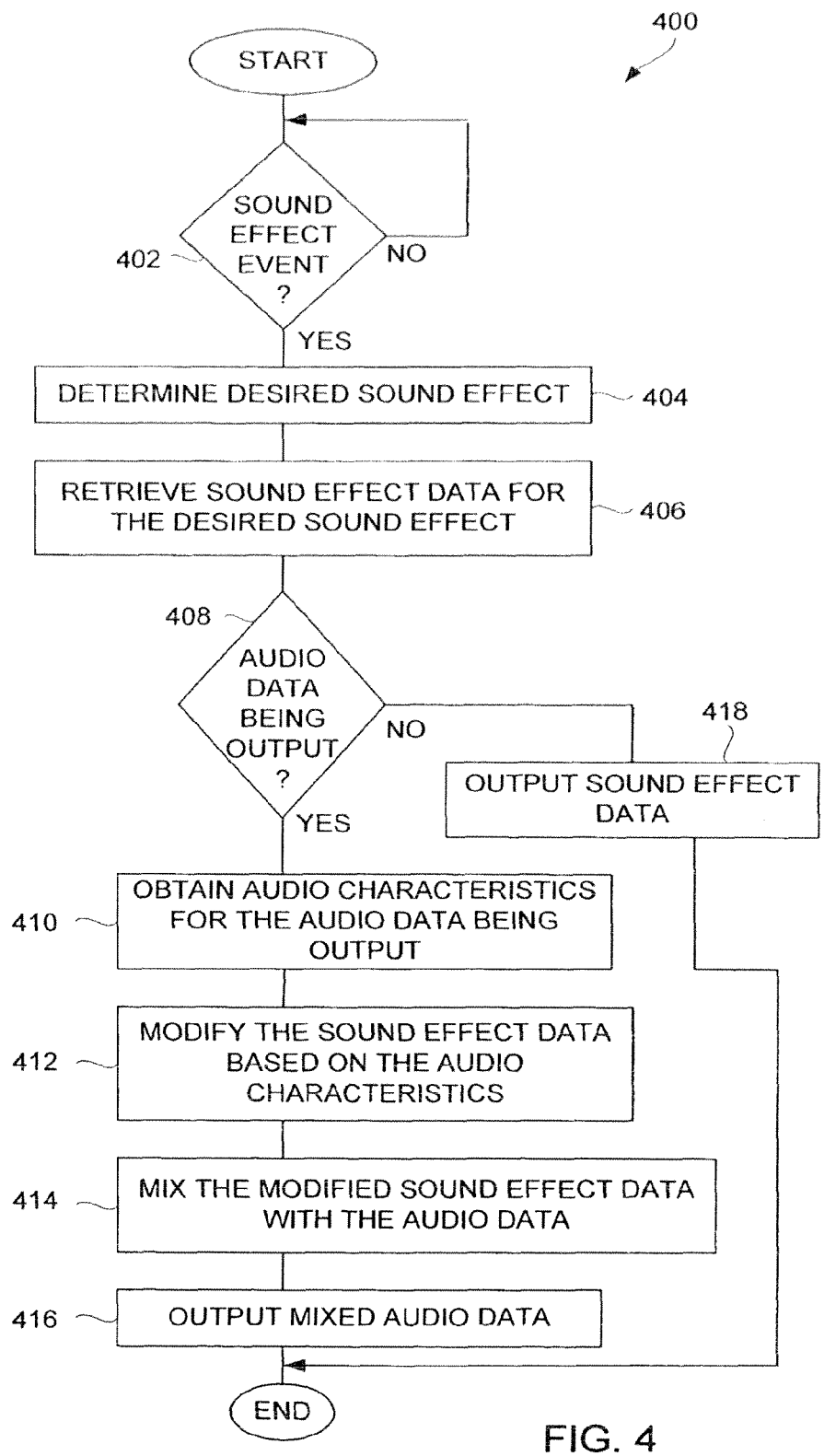
FIG. 4 is a flow diagram of an audio mixing process according to one embodiment of the invention.

FIG. 4 is a flow diagram of an audio mixing process 400 according to one embodiment of the invention. The audio mixing process 400 it is, for example, performed by the audio processing system 300 illustrated in FIG. 3.

The audio mixing process 400 begins with a decision 402 that determines whether a sound effect is to be output. When the decision 402 determines that a sound effect is not to be output, then the audio mixing process 400 awaits the need to output a sound effect. For example, the decision 206 of the audio output process 200 illustrated in FIG. 2 indicates that an audio system can make the determination of whether a sound effect is to be output. Accordingly, the audio mixing process 400 is invoked when a sound effect is to be output.

Once the decision 402 determines that a sound effect is to be output, a desired sound effect to be output is determined 404. Here, in one embodiment, the audio system can support a plurality of different sound effects. In such an embodiment, the audio system needs to determine which of the plurality of sound effects is the desired sound effect. The sound effect data for the desired sound effect is then retrieved 406.

A decision 408 then determines whether audio data is also being output. When the decision 408 determines that audio data is also being output, audio characteristics for the audio data being output are obtained 410. In one implementation, the audio characteristics pertain to metadata corresponding to the audio data being output. The sound effect data is then modified 412 based on the audio characteristics. In one embodiment, the audio characteristics can pertain to one or more of: audio resolution (e.g., bit depth), sample rate, and stereo/mono. For example, the audio resolution for the sound effect data can be modified 412 to match the audio resolution (e.g., bit depth) of the audio data. As another example, the sample rate for the sound effect can be modified 412 based on the sample rate of the audio data. In any case, after the sound effect data has been modified 412, the modified sound effect data is then mixed 414 with the audio data. Thereafter, the mixed audio data is output 416. As an example, the mixed audio data can be output 416 to an audio output device (e.g., speaker) associated with the audio system.

On the other hand, when the decision 408 determines that audio data is not being output, sound effect data is output 418. Here, since there is no audio data being output, the sound effect data can be simply output 418. If desired, the sound effect data can be modified before being output 418, such as to change audio resolution or sample rate conversion. Here, the output 418 of the sound effect data can also be provided to the audio output device. Following the operations 416 and 418, the audio mixing process 400 is complete and ends.

Figure 5:
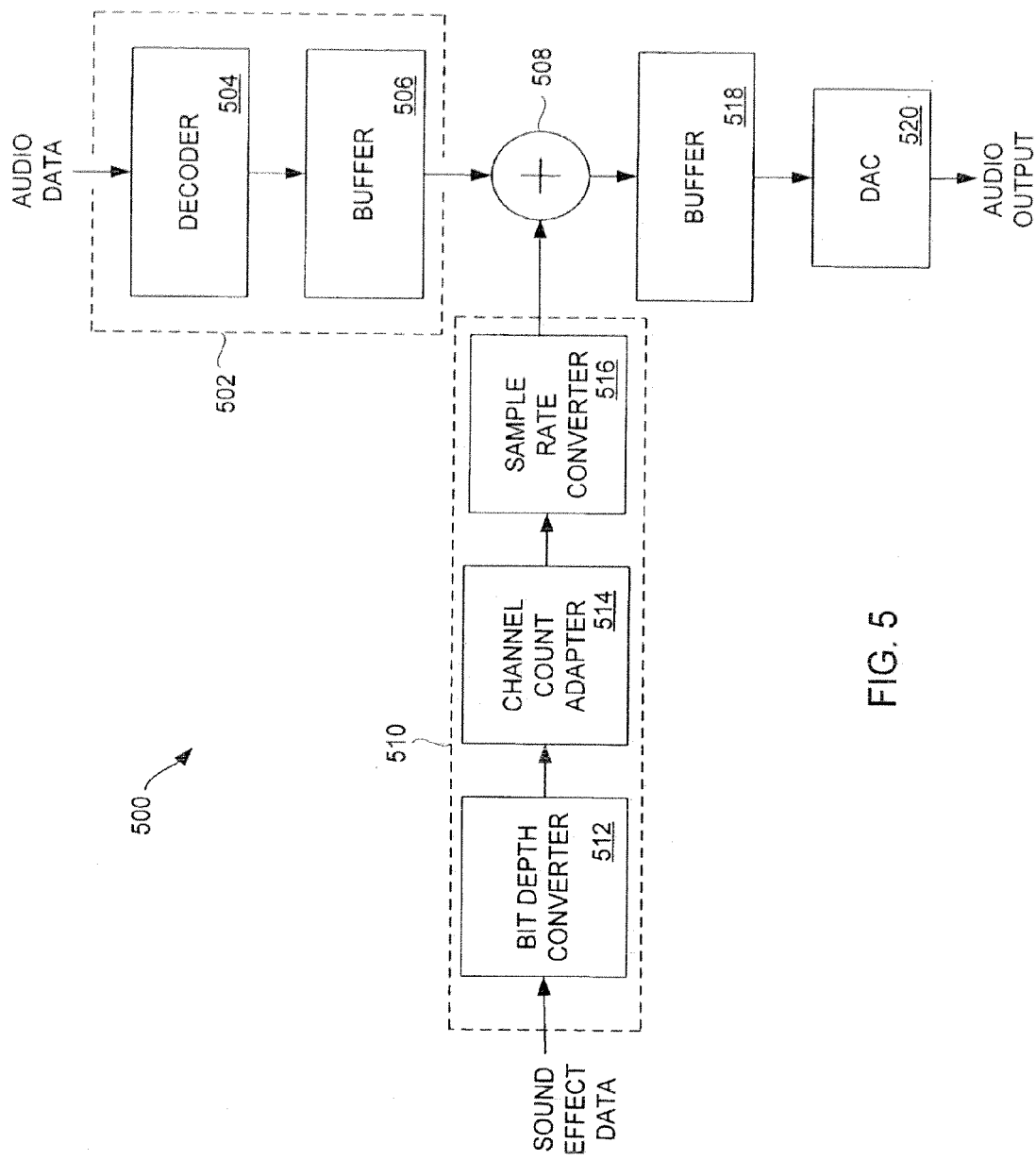
FIG. 5 is an audio processing system according to one embodiment of the invention.

FIG. 5 is an audio processing system 500 according to one embodiment of the invention. The audio processing system 500 includes an audio channel 502. The audio channel 502 includes a decoder 504 and a buffer 506. The decoder 504 receives incoming audio data. The decoder 504 decodes the audio data (which was previously encoded). The decoded audio data is then temporarily stored in the buffer 506. As needed for transmission, the decoded audio data is supplied from the buffer 506 to a mixer 508.

The audio processing system 500 also includes a mixer channel 510. The mixer channel 510 receives sound effect data that is to be output. Since the audio processing system 500 can process audio data of various bit depths, sample rates, and other criteria, the mixer channel 510 can serve to modify the sound effect data. One benefit of providing the mixer channel 500 with conversion or adaptation capabilities is the ability to modify in the audio characteristics of the sound effect data. By doing so, the sound effect data does not have to be stored by the audio system for a large number of different audio formats. Indeed, for efficient use of storage resources, only a single file for each sound effect need be stored. As needed, sound effect data can have its audio characteristics altered so as to closely match those of the audio data also being output by the audio processing system 500. In this regard, the mixer channel 500 can include a bit depth converter 512, a channel count adapter 514, and a sample rate converter 516. The bit depth converter 512 can convert the bit depth (i.e., resolution) of the sound effect data. As one example, if the sound effect data has a bit depth of eight (8) bits, the bit depth converter 512 could change the bit depth to sixteen (16) bits. The channel count adapter 514 can modify the sound effect data to provide mono or stereo audio components. The sample rate converter 516 converts the sample rate for the sound effect data. To assist the mixer channel 510 in converting or adapting the audio characteristics, the audio characteristics from the audio data provided to the audio channel 502 can be provided to the mixer channel 510, so as to inform the mixer channel 510 of the audio characteristics of the audio data in the audio channel 502.

The modified sound effect data output by the mixer channel 510 is supplied to the mixer 508. The mixer 508 adds or sums the decoded audio data from the audio channel 502 with the modified sound effect data from the mixer channel 510. The results of the mixer 508 is mixed audio data that is supplied to a buffer 518. The mixed audio data is digital data stored in the buffer 518. The audio processing system 500 also includes a Digital-to-Analog Converter (DAC) 520. The DAC 520 receives the mixed audio data from the buffer 518, which is digital data, and converts it into an analog audio output. The analog audio output can be supplied to an audio output device, such as a speaker.

Although the audio processing system 500 illustrated in FIG. 5 depicts a single audio channel and a single mixer channel, it should be understood that the audio processing system 500 can include more than one mixer channel. The advantage of having more than one mixer channel is that multiple sound effects can be output concurrently, thereby providing a polyphony audio effect.

Figure 6:
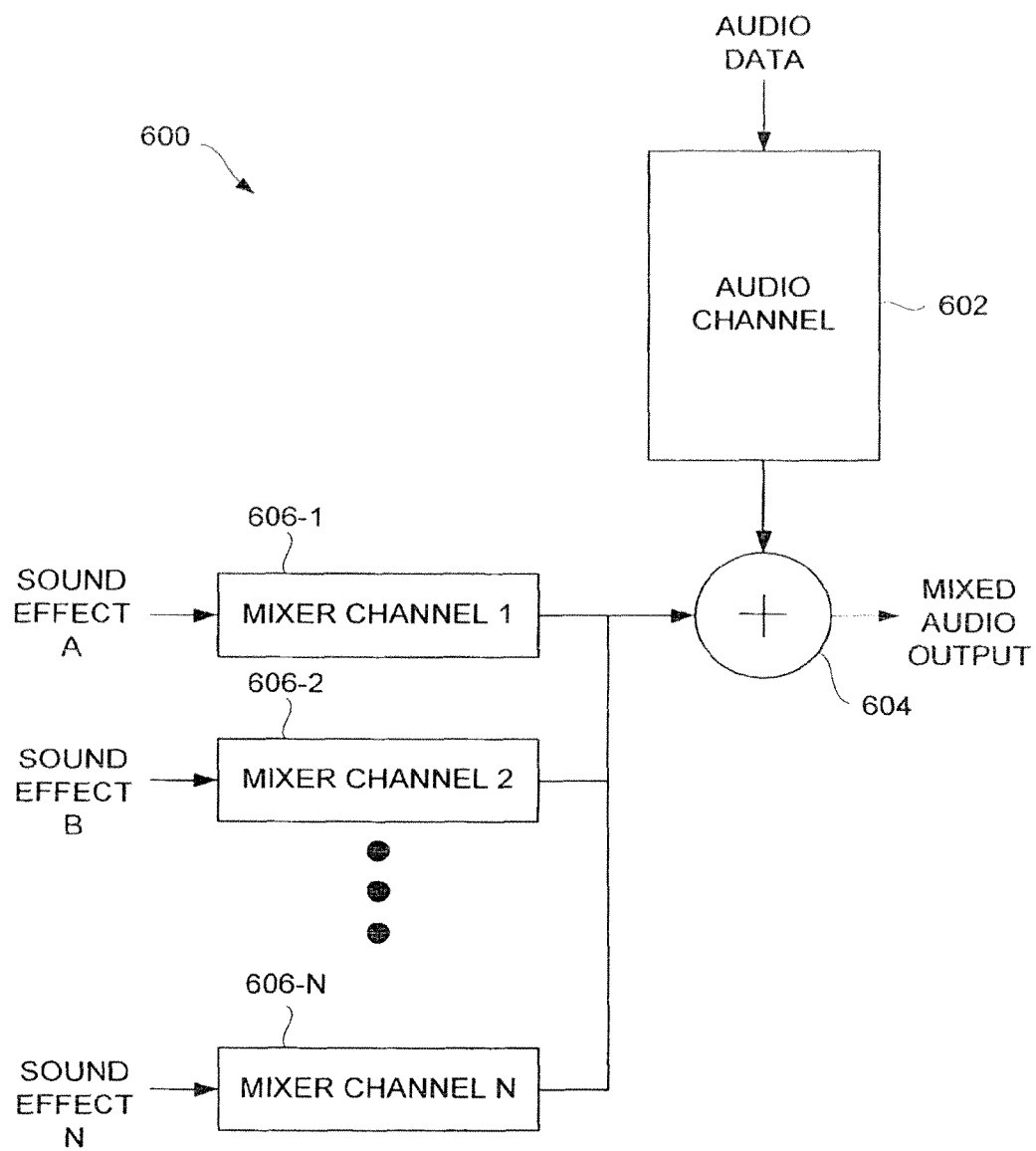
FIG. 6 is a block diagram of a multi-channel audio mixing system according to one embodiment of the invention.

FIG. 6 is a block diagram of a multi-channel audio mixing system 600 according to one embodiment of the invention. The multi-channel audio mixing system 600 includes an audio channel 602 that receives audio data and outputs decoded audio data. The decoded audio data being output by the audio channel 602 is supplied to a mixer 604. The multi-channel audio mixing system 600 also includes a plurality of mixer channel's 606-1, 606-2, . . . , 606-N. Each of the mixer channels 606 is capable of receiving a different sound effect. For example, the mixer channel 1 606-1 can receive a sound effect A, the mixer channel 2 606-2 can receive a sound effect B, and the mixer channel N can receive a sound effect N. If desired, the mixer channels 606 can each carry a sound effect at same time, or at least with partial temporal overlap, so that the various sound effects can be output substantial distortion amongst one another. Regardless of the number of sound effects being processed by the mixer channels 606, the sound effect data output from the mixer channels 606 are provided to the mixer 604. The mixer 604 combines the sound effect data from one or more of the channels 606 with the decoded audio data from the audio channel 602. The result of the mixer 604 is a mixed audio output that can be supplied to in audio output device.

Figure 7:
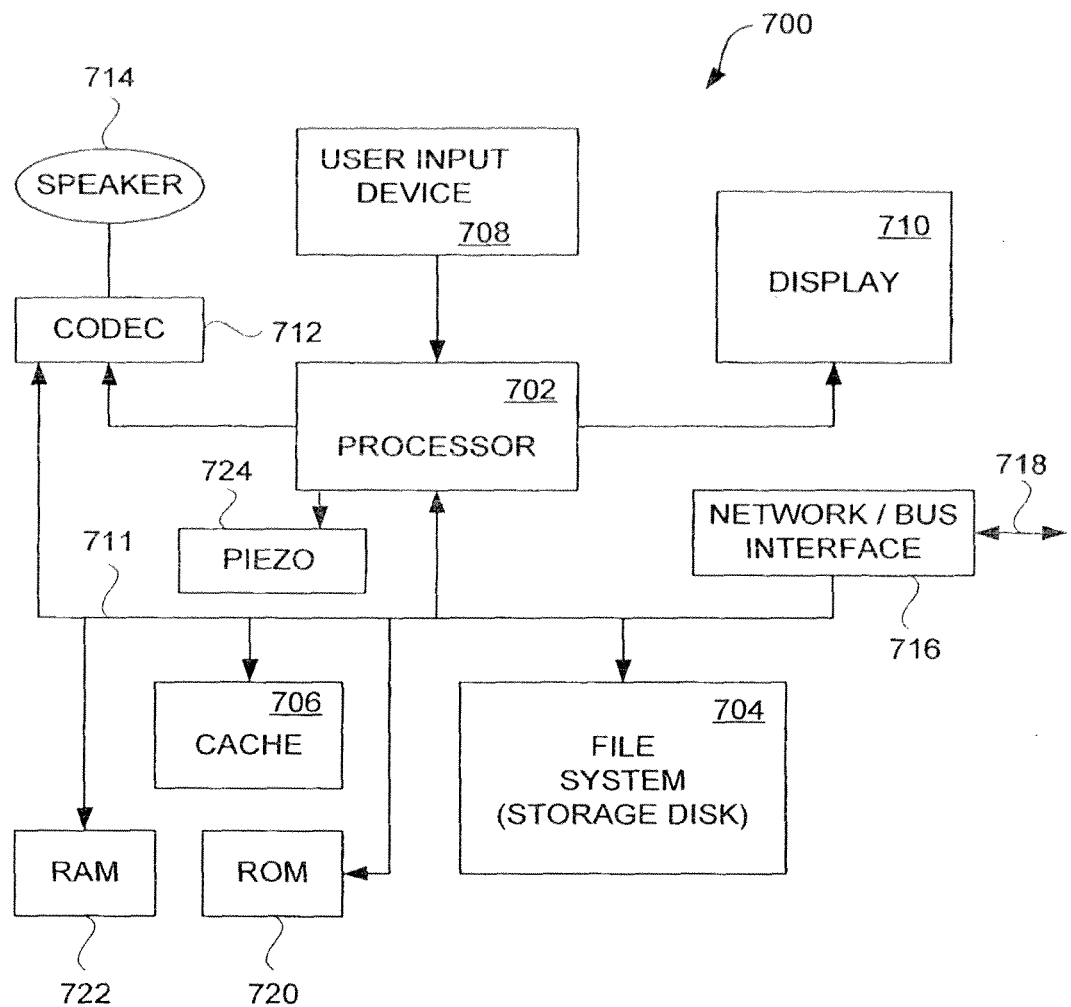
FIG. 7 is a block diagram of a media player according to one embodiment of the invention.

FIG. 7 is a block diagram of a media player 700 according to one embodiment of the invention. The media player 700 can implement the audio system 100 of FIG. 1 or the audio processing system 200, 500 of FIGS. 3 and 5 The media player 700 includes a processor 702 that pertains to a microprocessor or controller for controlling the overall operation of the media player 700. The media player 700 stores media data pertaining to media items in a file system 704 and a cache 706. The file system 704 is, typically, a storage disk or a plurality of disks. The file system 704 typically provides high capacity storage capability for the media player 700. The file system 704 can store not only media data but also non-media data (e.g., when operated in a disk mode). However, since the access time to the file system 704 is relatively slow, the media player 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the media player 700 is a portable media player that is powered by a battery (not shown). The media player 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The media player 700 also includes a user input device 708 that allows a user of the media player 700 to interact with the media player 700. For example, the user input device 708 can take a variety of forms, such as a button, keypad, dial, etc. In one implementation, the user input device 708 can be provided by a dial that physically rotates. In another implementation, the user input device 708 can be implemented as a touchpad (i.e., a touch-sensitive surface). In still another implementation, the user input device 708 can be implemented as a combination one or more physical buttons and well as a touchpad. Regardless of how implemented, as the user interacts with the user interface device 708, a piezoelectric device 724 can provide auditory feedback to the user. For example, the piezoelectric device 724 can be controlled by the processor 702 to emit a sound in response to a user action (e.g., user selection or button press). Still further, the media player 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the media player 700 serves to store a plurality of media items (e.g., songs) in the file system 704. When a user desires to have the media player play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the media player 700 or external to the media player 700. For example, headphones or earphones that connect to the media player 700 would be considered an external speaker. The speaker 714 can not only be used to output audio sounds pertaining to the media item being played, but also to output sound effects. The sound effects can be stored as audio data on the media player 700, such as in file system 704, the cache 706, the ROM 720 or the RAM 722. A sound effect can be output in response to a user input or a system request. When a particular sound effect is to be output to the speaker 714, the associated sound effect audio data can be retrieved by the processor 702 and supplied to the CODEC 712 which then supplies audio signals to the speaker 714. In the case where audio data for a media item is also being output, the processor 702 can process the audio data for the media item as well as the sound effect. In such case, the audio data for the sound effect can be mixed with the audio data for the media item. The mixed audio data can then be supplied to the CODEC 712 which supplies audio signals (pertaining to both the media item and the sound effect) to the speaker 714.

The media player 700 also includes a network/bus interface 716 that couples to a data link 718. The data link 718 allows the media player 700 to couple to a host computer. The data link 718 can be provided over a wired connection or a wireless connection. In the case of a wireless connection, the network/bus interface 716 can include a wireless transceiver.

In one embodiment, the media player 700 is a portable computing device dedicated to processing media such as audio. For example, the media player 700 can be a music player (e.g., MP3 player), a game player, and the like. These devices are generally battery operated and highly portable so as to allow a user to listen to music, play games or video, record video or take pictures wherever the user travels. In one implementation, the media player 700 is a handheld device that is sized for placement into a pocket or hand of the user. By being handheld, the media player 700 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Figure 8:
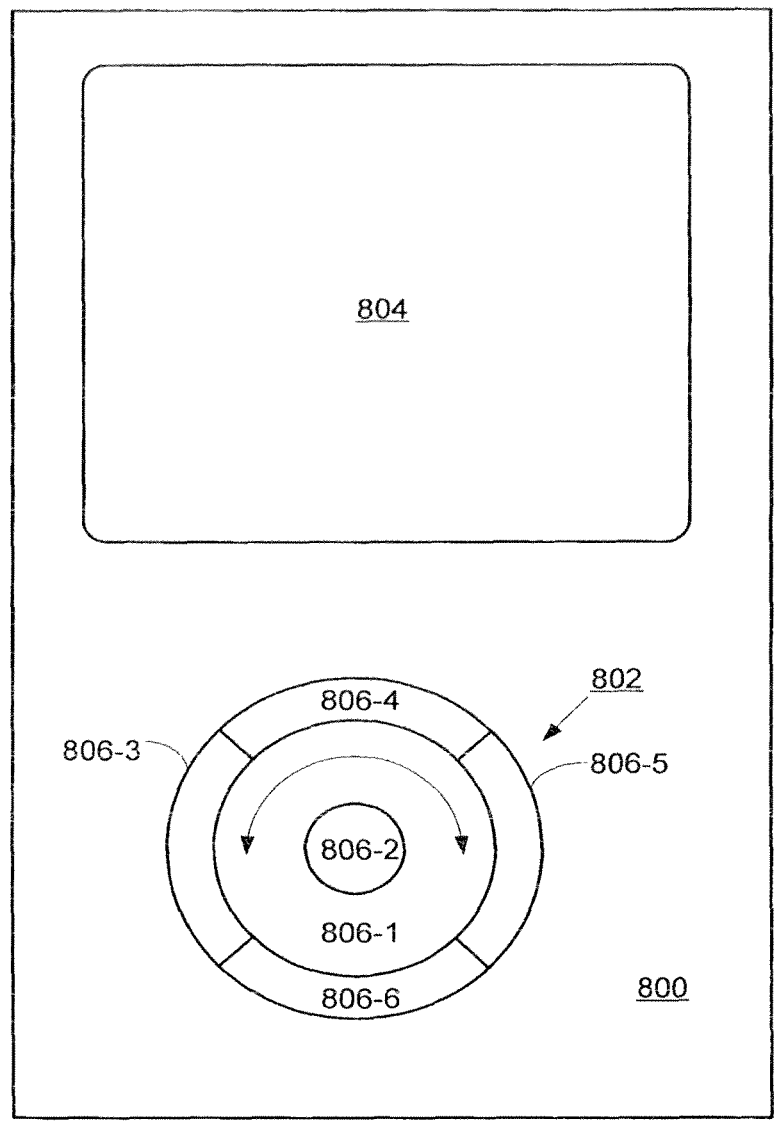
FIG. 8 illustrates a media player having a particular user input device according to one embodiment.

The user input device 708 can take a variety of forms, such as a button, keypad, dial, etc. (physical or soft implementations) each of which can be programmed to individually or in combination to perform any of a suite of functions. FIG. 8 illustrates a media player 800 having a particular user input device 802 according to one embodiment. The media player 804 can also include a display 804. The user input device 802 includes a number of input devices 806, which can be either physical or soft devices. Such input devices 806 can take the form of a rotatable dial 806-1, such as in the form of a wheel, capable of rotation in either a clockwise or counterclockwise direction. A depressible input button 806-2 can be provided at the center of the dial 806-1 and arranged to receive a user input event such as a press event. Other input buttons 806 include input buttons 806-3 through 806-6 each available to receive user supplied input action.

As noted above, the audio system can be utilized to mix sound effects with player data such that the mixed audio can be output to an audio output device. The audio system can be system or user configurable as to sound effect processing. For example, a user may desire sound effects to be output to a particular audio output device of the audio system. As one example, the audio output device can be an in-device speaker. As another example, a user may desire sound effects to be output to a headphone (earphone) instead of or in addition to any in-device speaker.

Figure 9:
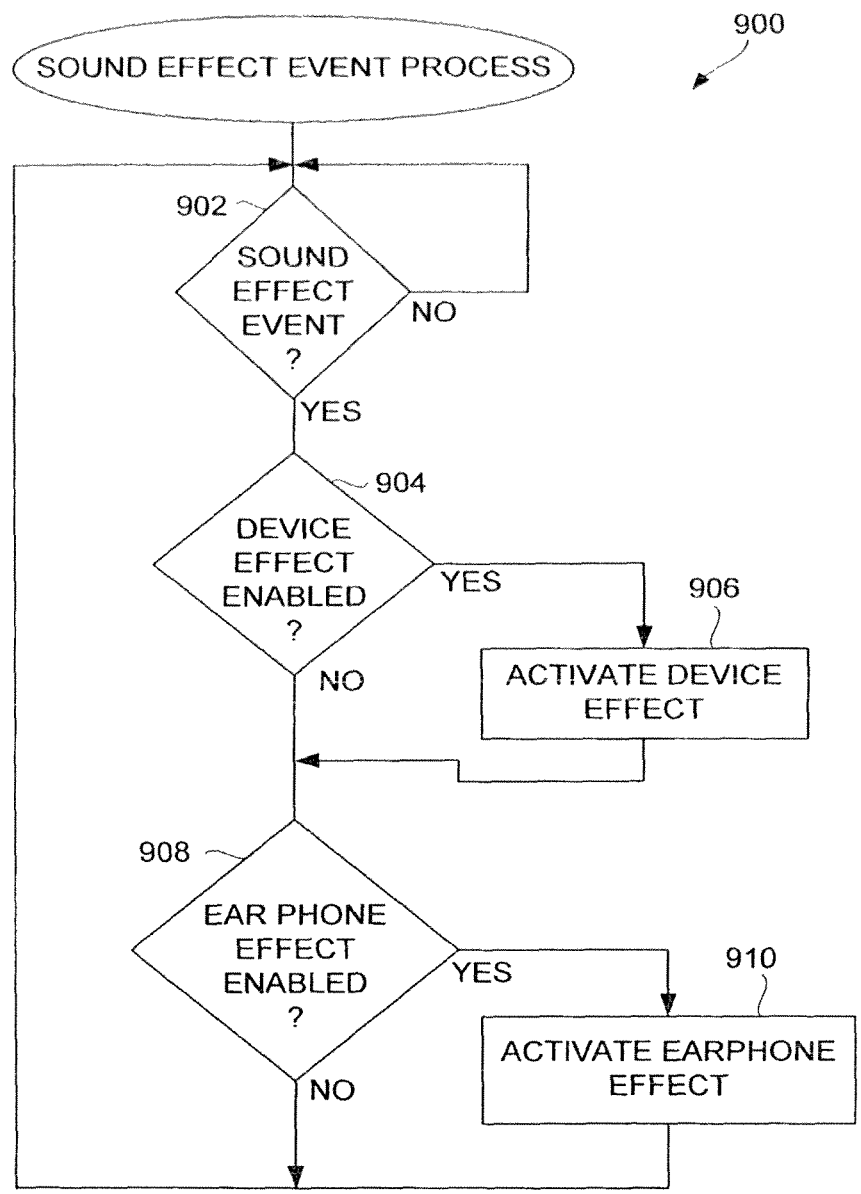
FIG. 9 is a flow diagram of a sound effect event process according to one embodiment of the invention.

FIG. 9 is a flow diagram of a sound effect event process 900 according to one embodiment of the invention. The sound effect event process 900 begins with a decision 902 that determines whether a sound effect event has been initiated. An audio system, or its user, can initiate a sound effect event. When the decision 902 determines that a sound effect event has not been issued, then the sound effect event process 900 awaits such an event. On the other hand, once the decision 900 determines that a sound effect event has been issued, a decision 904 determines whether a device effect is enabled. When the decision 904 determines that the device effect is enabled, then a device effect is activated 906. The device effect corresponds to an audio output device which can be activated to physically produce the sound effect. For example, the device effect can be produced by an in-device speaker. One type of speaker is a loudspeaker. Another type of speaker is a piezoelectric speaker (e.g., piezoelectric device 724).

A user or system can configure the audio system to provide a given sound effect, the device effect, via an audio output device. For example, if the audio output device is a piezoelectric speaker, the system can control the audio output device to provide the device effect that corresponds to the sound effect event that has been issued. For example, if the sound effect event issued was a "mouse click" event, then the device effect could be a click sound that is physically generated by an electrical control signal supplied to the piezoelectric speaker.

On the other hand, when the decision 904 determines that the device effect is not enabled, or following the activation 906 if the device effect was enabled, a decision 908 determines whether an earphone effect is enabled. Here, the system or user can configure the audio system to provide a sound effect to the user via one or more earphones coupled to the audio system. When the decision 908 determines that the earphone effect is enabled, then an earphone effect is activated 910. By activation 910 of the earphone effect, the appropriate sound effect is output to the user by way of the one or more earphones. As a result, should the user be wearing be earphones, the sound effect is able to be perceived in an audio manner by the user. Following the operation 910, or following the decision 908 when the earphone effect is not enabled, the sound effect event process 900 returns to repeat the decision 902 and subsequent operations so that additional sound effect events can be processed.

In one embodiment, the audio system makes use of a graphical user interface to assist the user with configuring audible sound effects. For example, the user may desire to have little or no sound effects active. On the other hand, when sound effects are these partial the active, the user may desire the sound effects be provided at an in-device speaker of the audio system. Alternatively, or in addition, the user may also desire sound effects to be provided in an audio manner via an earphone or headphone.

Figure 10:
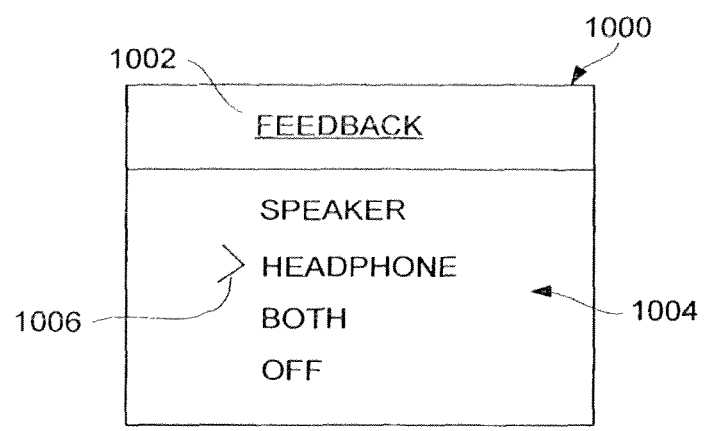
FIG. 10 illustrates a graphical user interface according to one embodiment of the invention.

FIG. 10 illustrates a graphical user interface 1000 according to one embodiment of the invention. The graphical user interface 1000 allows a user to configure a portable computing device for auditory feedback. More particularly, the graphical user interface 1000 includes a header or title 1002 designating that the graphical user interface pertains to "Feedback". The graphical user interface 1000 also displays a menu or list 1004 of user selectable items. In this example, the menu or list 1004 includes four user selectable items, namely, "Speaker", "Headphone", "Both" and "Off". The "Speaker" selection causes the configuration to provide auditory feedback via a speaker (e.g., piezoelectric device 724). The "Headphone" selection causes the configuration to provide auditory feedback via earphone(s) or headphone(s) (e.g., external speaker 714 (external)). The "Both" selection causes the configuration to provide auditory feedback via a speaker (e.g., piezoelectric device 724) and an earphone(s) or headphone(s) (e.g., external speaker 714 (external)). The "Off" selection causes the configuration to provide no auditory feedback. A selector 1006 indicates current selection of the "Headphone" item.

One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to utilize and manage media assets. One example of a media management application is iTunes®, produced by Apple Computer, Inc.

The various aspects, embodiments, implementations or features of invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that processing resources required to implement audio sound effects can be substantially reduced. A media device that is highly portable can make use of audio sound effects. Another advantage of the invention is that sound effects can be output even while a media device is outputting other media (e.g., music). Another advantage of the invention is that the audio data for sound effects can be stored in a single formats and converted to other formats as appropriate to substantially match audio data of a media item being played. Still another advantage of the invention is that multiple sound effects can be output concurrently with substantial preservation of their intelligibility.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. In a computing device, a method for adding an original sound effect file to a first media item during audio playback of the first media item, the method comprising:
   receiving an indication of a sound effect event;
   identifying an original sound effect file that is associated with the sound effect event;
   determining whether a first media item is being played through a first audio output device when the indication of the sound effect event is received and, if so, retrieving a plurality of formatting characteristics of the first media item which is being hosted on a first channel;
   modifying one or more formatting characteristics on a second channel to match all of the retrieved plurality of formatting characteristics of the first media item which is being hosted on the first channel, so as to modify the original sound effect file on the second channel to create a modified sound effect file;
   adding the modified sound effect file and the first media item to create a modified first media item; and
   continuing audio playback of the media item by outputting the modified first media item through the first audio output device.

2. The method of claim 1, wherein the first audio output device is a single speaker on the computing device.

3. The method of claim 1, wherein the creating a modified sound effect file includes:
   formatting a copy of the original sound effect file so as to have a substantially similar format as the first media item.

4. The method of claim 3, wherein the formatting includes altering a bit depth of the copy of the original sound effect file to match a bit depth of the first media item.

5. The method of claim 3, wherein the formatting includes altering a sample rate of the copy of the original sound effect file to match a sample rate of the first media item.

6. The method of claim 3, wherein when the first media item is in stereo, the formatting includes changing the copy of the original sound effect file from mono to stereo.

7. The method of claim 3, wherein when the first media item is in mono, the formatting includes changing the copy of the original sound effect file from stereo to mono.

8. A portable media device comprising:
   a memory for digitally storing a plurality of media items and a plurality of original sound effect files;
   an audio decoder arranged to decode a first media item;
   a processor configured to:
      receive an indication of a sound effect event and identify an original sound effect file that is associated with the sound effect event;
      determine whether the first media item is being played through a first audio output device when the indication of the sound effect event is received and, if so, retrieve a plurality of formatting characteristics of the first media item which is being hosted on a first channel;
      modify one or more formatting characteristics on a second channel to match all of the retrieved plurality of formatting characteristics of the first media item which is being hosted on the first channel, so as to modify the original sound effect file on the second channel to create a modified sound effect file;
      add the modified sound effect file and the first media item to create a modified first media item; and
      continue audio playback by outputting the modified first media item; and
   a digital-to-analog converter configured to convert the modified first media item into an analog audio data format and send the converted modified first media item to a first audio output device during audio playback of the first media item.

9. A portable media device as recited in claim 8 further comprising:
   a memory buffer configured to temporarily store the modified first media item prior to it being played; and
   wherein the processor includes a bit depth converter, a channel count adapter, and a sample rate converter; and
   wherein the portable media device is selected from the group consisting of a mobile phone, a hand-held media player that can easily be held by and within a single hand of a user; and a hand-held audio player that can easily be held by and within a single hand of a user.

10. A method for adding an original sound effect file to a first media item on a portable computing device the method comprising:
    determining a bit rate, sample rate, and stereo characteristics of the first media item;
    receiving the original sound effect file and the bit rate, sample rate and stereo characteristics of the original sound effect file;
    creating a modified sound effect file by modifying one or more of the bit rate, sample rate, and stereo characteristics of the original sound effect file to match the bit rate, sample rate, and stereo characteristics, respectively, of the first media item;
    adding the first media item and the modified sound effect file to create a modified first media item;
    retrieving a configuration profile indicating a first audio output device to play the first media item and a second audio output device to play the original sound effect file;
    playing the modified first media item through the first audio device;
    playing the original sound effect file through a second audio output device at essentially the same time as the playing of the modified first media item through the first audio output device.

11. The method of claim 10, wherein the configuration profile includes configuration settings that are based partially on whether headphones are currently connected to a headphone jack of the portable computing device.

12. The method of claim 10, further comprising:
    storing the modified first media item in a buffer prior to playing it.

13. A portable media device comprising:
    a memory storing a plurality of media items and a plurality of original sound effect files;
    a processor adapted to receive an indication of a sound effect event, where the processor is configured to:
       identify an original sound effect file that is associated with the sound effect event;
       determine whether a first media item is being played through a first audio output device when the indication of the sound effect event is received and, if so, retrieve a plurality of formatting characteristics of the first media item which is being hosted on a first channel;

modify one or more formatting characteristics on a second channel to match all of the retrieved plurality of formatting characteristics of the first media item which is being hosted on the first channel, so as to modify the original sound effect file on the second channel to create a modified sound effect file;

add the modified sound effect file and the first media item to create a modified first media item; and continue audio playback of the first media item by outputting the modified first media item; and a digital-to-analog converter configured to convert the modified first media item into an analog audio data format and send the converted modified first media item to a first audio output device during said audio playback.

14. The portable media device of claim 13, further comprising a memory buffer configured to temporarily store the modified first media item prior to it being delivered to the digital-to-analog converter and played.

15. The portable media device of claim 13, wherein the portable media device is a mobile phone.

16. The portable media device of claim 13, wherein the processor that modifies one or more of the formatting characteristics of the original sound effect file comprises:
a bit depth converter;
a channel count adapter; and
a sample rate converter.

17. An apparatus for seamlessly integrating an original sound effect file with a first media item, the apparatus comprising:

means for determining a bit rate, sample rate, and stereo characteristics of the first media item;

means for receiving an indication of the bit rate, sample rate and stereo characteristics at a conversion unit;

means for receiving the original sound effect file at the conversion unit;

means for creating a modified sound effect file by modifying bit rate, sample rate, and stereo characteristics of the original sound effect file to match the bit rate, sample rate, and stereo characteristics, respectively, of the first media item;

means for adding the first media item and the modified sound effect file to create a modified first media item by an adder unit;

means for retrieving a configuration profile indicating a first audio output device to play the first media item and a second audio output device to play the original sound effect file;

means for playing the modified first media item through the first audio device; and means for playing the original sound effect file through a second audio output device at essentially the same time as the playing of the modified first media item through the first audio output device.

18. The apparatus of claim 17, wherein the means for adding includes means for digitally adding the first media item and the modified sound effect file.

19. The apparatus of claim 17, further comprising means for converting the modified first media item to analog format for playing on the first audio output device.

20. The apparatus of claim 17, wherein the second audio output device is a piezoelectric speaker.

21. A non-transitory program storage device readable by a machine tangibly embodying a program of instructions executable by the machine to perform a method for adding an original sound effect file with a first media item during audio playback of the first media item, the method comprising:

receiving an indication of a sound effect event;

identifying an original sound effect file that is associated with the sound effect event;

determining whether a first media item is being played through a first audio output device when the indication of the sound effect event is received and, if so, retrieving a plurality of formatting characteristics of the first media item which is being hosted on a first channel;

modifying one or more formatting characteristics on a second channel to match all of the retrieved plurality of formatting characteristics of the first media item which is being hosted on the first channel, so as to modify the original sound effect file on the second channel to create a modified sound effect file;

adding the first media item and the modified sound effect file to create a modified first media item; and during playback of the first media item, playing the modified first media item through a first audio output device.

22. The program storage device of claim 21, wherein the first audio output device is a headphone jack of a portable media device.

23. The program storage device of claim 21, wherein the method further comprises:

playing the original sound effect file through a second audio output device at essentially the same time as the playing of the modified first media item through the first audio output device.

24. The program storage device of claim 21, wherein the first audio output device is a single speaker on a portable media device.

* * * * *